United States Patent [19]
Steigerwald et al.

[11] 3,856,365
[45] Dec. 24, 1974

[54] ANTI-SKID CONTROL SYSTEM FOR AIRCRAFT

[75] Inventors: John R. Steigerwald, Canton; John P. Rasmussen; Angelo T. Crapanzano, both of Akron, all of Ohio

[73] Assignee: The Goodyear Tire & Rubber Company, Akron, Ohio

[22] Filed: Oct. 3, 1972

[21] Appl. No.: 294,553

[52] U.S. Cl................. 303/21 BE, 244/111, 303/20
[51] Int. Cl................................................. B60t 8/12
[58] Field of Search................. 188/181 A; 244/111; 303/20, 21; 324/162; 340/53, 262

[56] References Cited
UNITED STATES PATENTS

| | | | |
|---|---|---|---|
| 3,275,384 | 9/1966 | Hirzel............................ | 303/21 CG |
| 3,545,817 | 12/1970 | Yarber..................... | 303/21 BE UX |
| 3,604,761 | 9/1971 | Okamoto et al. .............. | 303/21 CG |
| 3,614,174 | 10/1971 | Romero ............................ | 303/20 X |
| 3,656,816 | 4/1972 | Schlitz et al...................... | 303/21 P |
| 3,677,609 | 7/1972 | Davis et al...................... | 303/21 BE |
| 3,709,567 | 1/1973 | Van Ostrom et al. .......... | 303/21 BE |
| 3,710,186 | 1/1973 | Sharp.......................... | 303/21 BE X |
| 3,711,163 | 1/1973 | Booher............................ | 303/21 P |
| 3,717,384 | 2/1973 | Harned .......................... | 303/21 BE |
| 3,724,902 | 4/1973 | Ruof............................ | 303/21 BE X |
| 3,724,916 | 4/1973 | Hirzel ............................ | 303/21 BE |

*Primary Examiner*—Trygve M. Blix
*Assistant Examiner*—Stephen G. Kunin
*Attorney, Agent, or Firm*—F. W. Brunner; P. H. Milliken;

[57] ABSTRACT

A vehicle brake control system is disclosed which provides smooth and efficient braking under all runway conditions. The system includes a wheel speed sensor and converter which produces a DC signal proportional in voltage to the rotational velocity of the wheel, and an anti-skid control system which is responsive to the signal and which controls the brake actuating valve. The control system consists of three control loops: a minor loop providing a full release signal during a deep incipient skid, a major control loop which provides continuous proportional control throughout a braking stop, and an auxiliary control loop which prevents inadvertent application of the brakes prior to touchdown.

13 Claims, 20 Drawing Figures

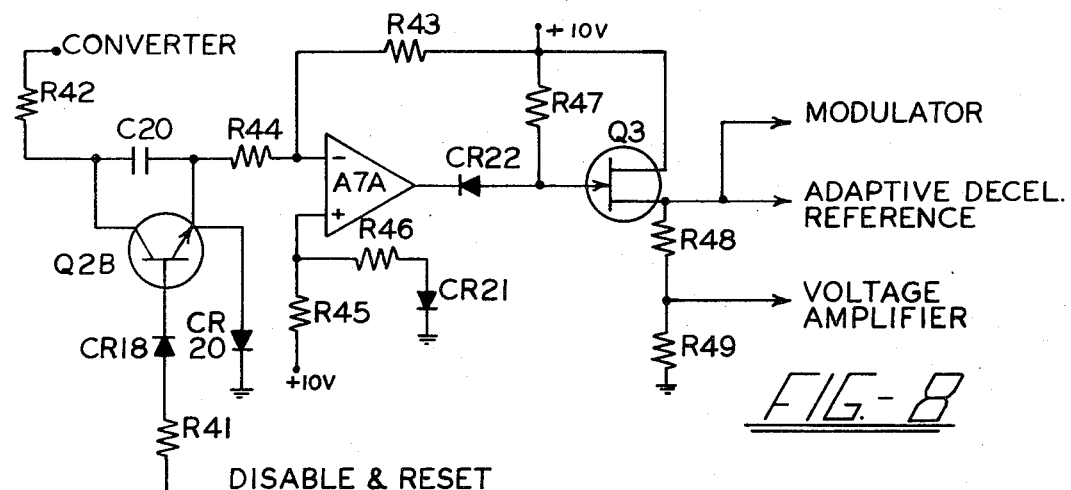
FIG-8
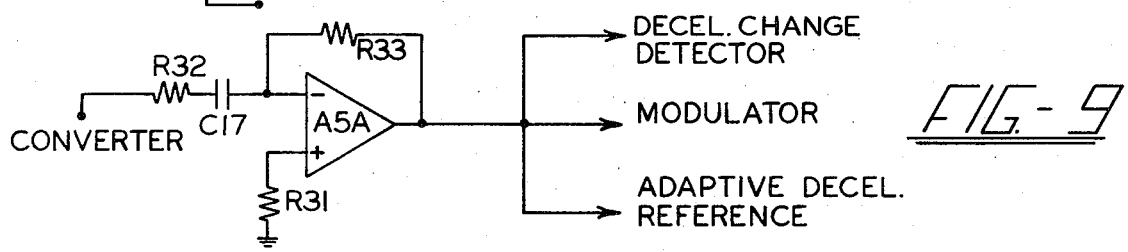
FIG-9
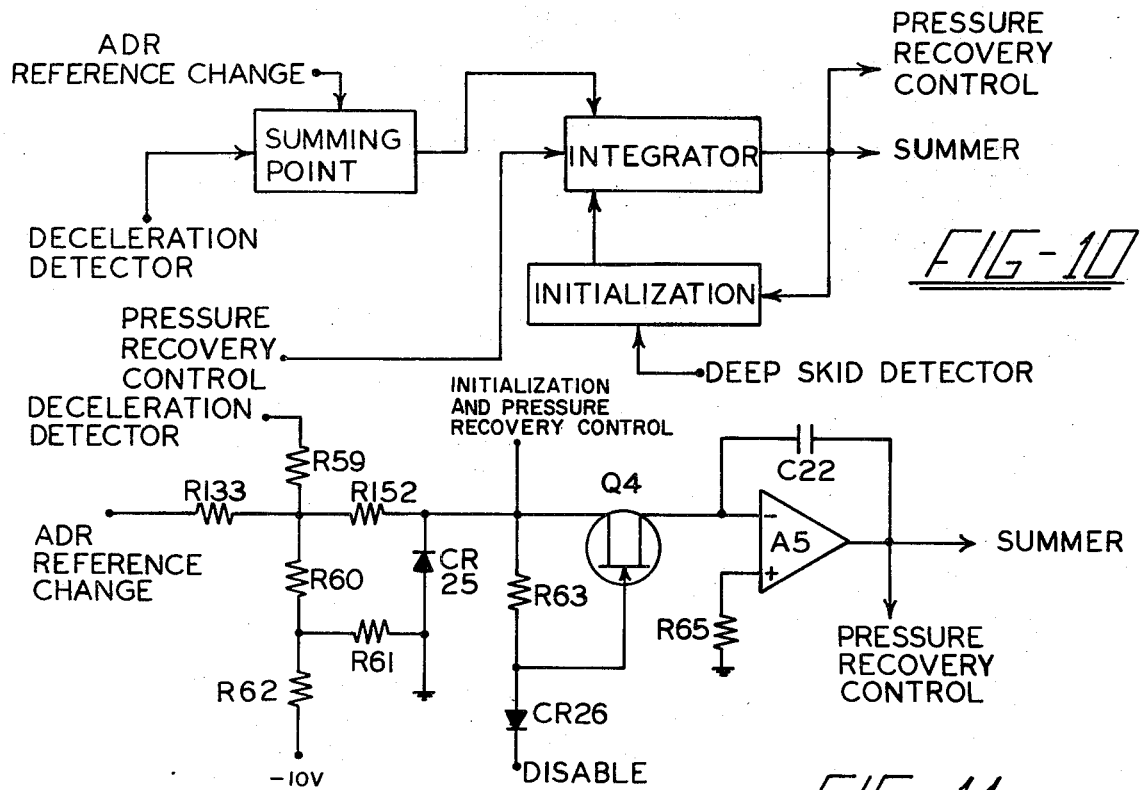
FIG-10
FIG-11

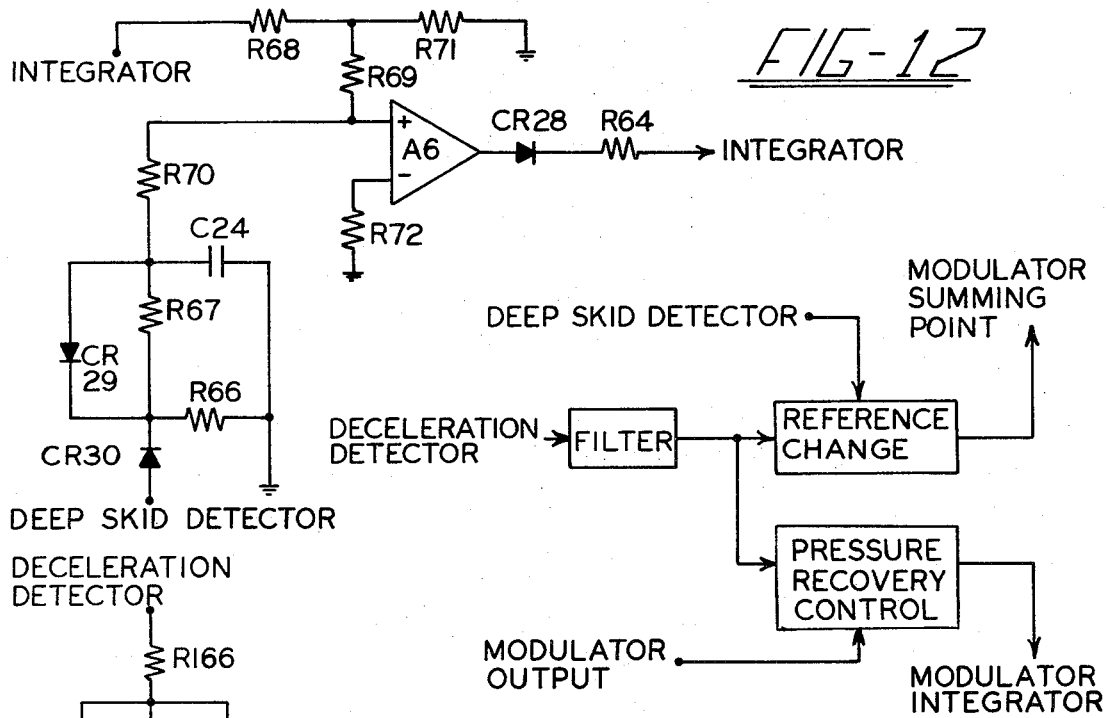
FIG-12
FIG-13
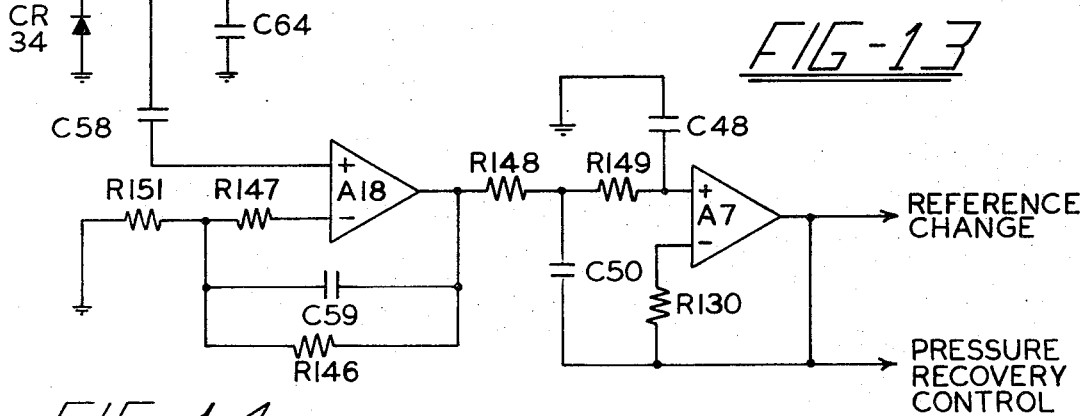
FIG-14
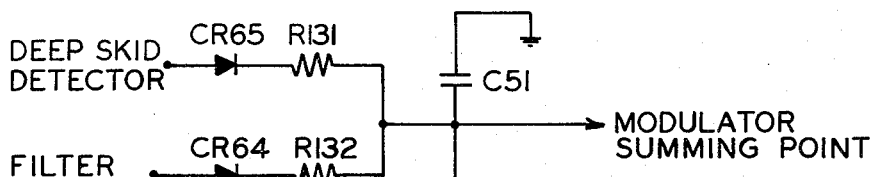
FIG-15
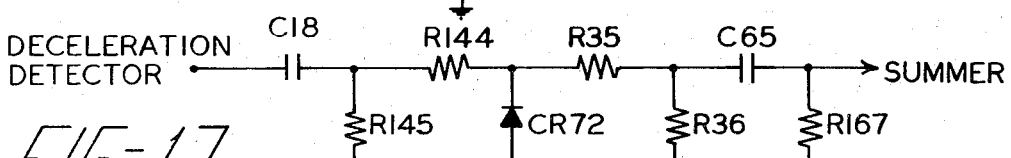
FIG-17

ANTI-SKID CONTROL SYSTEM FOR AIRCRAFT

The present invention relates to an anti-skid brake control system and particularly to such a system for use on an aircraft.

The control system of the present invention is of the type in which small changes in wheel deceleration are sensed and used to control brake pressure in a proportional manner so that the aircraft deceleration is maintained at the highest possible level consistent with runway surface condition, and wheel speed variations are held minimal. Since the skidding tendency of a wheel varies with the runway coefficient, the control system preferably is provided with the ability to adjust its control signals rapidly so that efficient braking is maintained on a runway surface having large variations in tire to ground coefficient.

It is the primary object of the present invention to provide an anti-skid control system for aircraft brakes which possesses an improved capability of detecting wheel deceleration changes and of controlling the brake pressure so as to achieve the desired maximum braking efficiency.

It is also an object of the invention to provide an anti-skid control system which responds more rapidly and accurately to variable braking conditions than do prior systems.

The above and other objects and advantages of the invention will become apparent from the following description and the accompanying drawings wherein there is shown a preferred embodiment of the invention.

In the drawings:

FIG. 8 is an electrical schematic of the deep skid detector;

FIG. 9 is an electrical schematic of the deceleration detector;

FIG. 10 is a block diagram of the modulator circuit;

FIG. 11 is an electrical schematic of the summing point and integration portions of the modulator circuit;

FIG. 12 is an electrical schematic of the modulator initialization circuit;

FIG. 13 is a block diagram of the adaptive deceleration reference circuit;

FIG. 14 is an electrical schematic of the ADR filter circuit;

FIG. 15 is an electrical schematic of the ADR reference change circuit;

FIG. 17 is an electrical schematic of the deceleration change detector circuit;

It should be understood that in the following description, while the references to specific signal strengths and to specific speed and deceleration rates are illustrative of the preferred embodiment, the invention is not limited by these references. The descriptive phrase "incipient skid" is used throughout and is defined as any change, however small, from a synchronous ground speed to a zero wheel speed in wheel deceleration which, if not corrected, would eventually result in a locked wheel skid.

ANTI-SKID CONTROL SYSTEM

Figure 1:
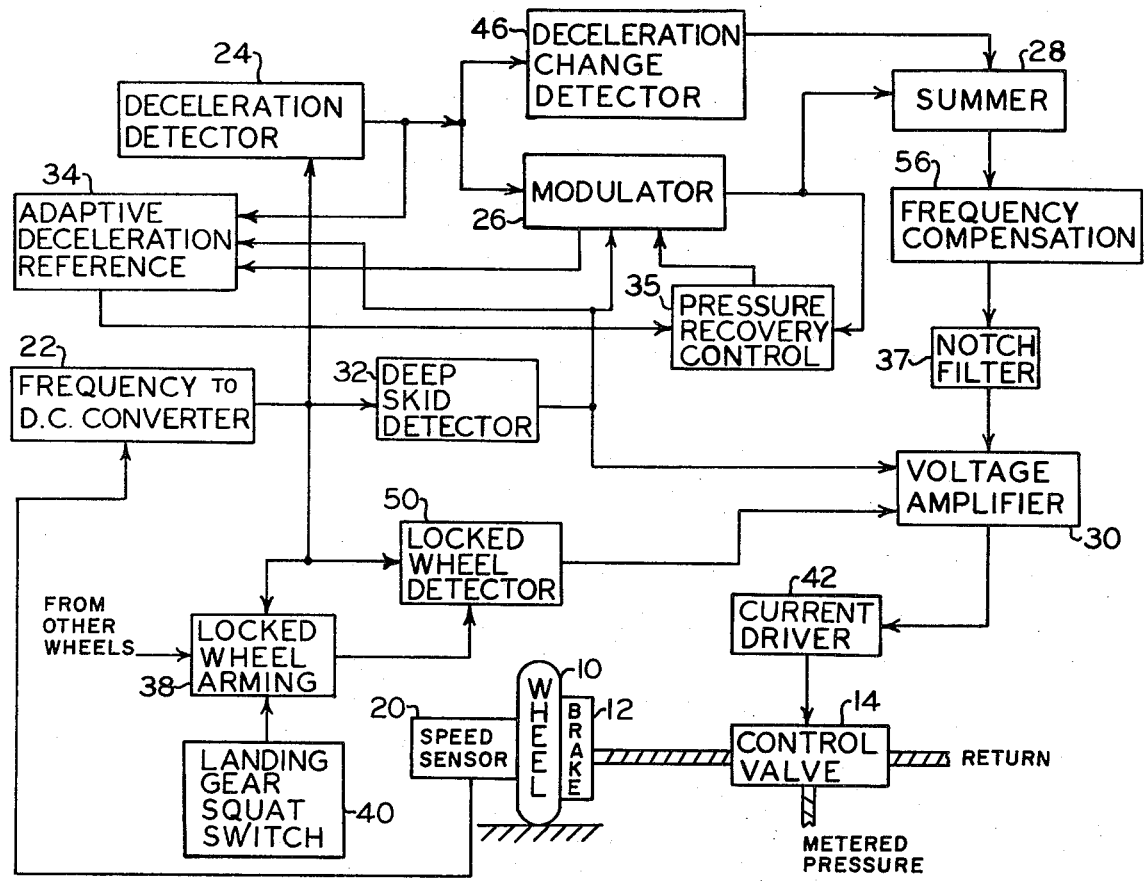
FIG. 1 is a block diagram of the basic system configuration for one main wheel.

The block diagram of FIG. 1 shows the complete anti-skid control system for one wheel. The wheel 10 is equipped with a brake 12 which is controlled by a valve 14. The wheel 10 is also equipped with a speed sensor 20. This speed sensor 20 may consist of a coil with a permanent magnet core and four equally spaced poles on its periphery which is mounted stationary at the end of the axle and a toothed exciter ring which is attached to the wheel hub-cap and positioned to rotate in close proximity to the poles of the sensor coil. With this type of sensor, rotation of the exciter ring causes a fluctuation in the magnetic field of the coil which results in an AC output signal which has a frequency directly proportional to the rotational velocity of the wheel. The AC signal from the wheel speed sensor 20 is supplied to a frequency to DC converter 22 and is there converted to a direct current signal whose voltage is directly proportional to the wheel rotational velocity. The output of the frequency converter 22 provides an input to the anti-skid control circuitry.

The anti-skid control system consists of three control loops: a minor control loop, an auxiliary control loop, and a major control loop. The minor control loop through the deep skid detector 32 is an on-off type control functioning only during deep incipient skids to provide a full-release signal to the control valve 14. It serves as a back-up for the major control loop in cases where runway conditions make a rapid change beyond the normal limits of the major control loop. The major control loop is through the deceleration detector 24 and provides continuous proportional control throughout a braking stop. The auxiliary control loop is through the locked wheel arming circuit 38 and the locked wheel detector circuit 50 and prevents the inadvertent application of brakes prior to touchdown. It also prevents a locked wheel under extremely slippery runway conditions. The minor and auxiliary control loops come into operation only when the pilot applies sufficient brake pressure to cause incipient wheel skids which the major control loop cannot handle, such as the first incipient skid on a low-co-efficient runway or skid which may be caused by large transient co-efficient changes occurring during the stop. Below an aircraft speed of 23 miles per hour, the auxiliary control loop is purposely disabled and below 17 miles per hour the minor control loop becomes ineffective due to lack of available wheel speed signal change to operate the deep skid detector 32. The major proportioning control loop loses effective braking control at about 8 miles per hour. Thus, the wheels will lock up below 8 miles per hour if sufficient brake pressure exists. However, a wheel lock up at this slow speed would not be harmful. The operation of the three control loops is described more fully in the following paragraphs.

Wheel speed information is supplied from the wheel speed sensor 20 in the form of an AC signal, the frequency of which is proportional to the actual wheel speed by the ratio of 5.25 Hz per MPH. This signal is fed to the frequency to DC converter 22 where it is changed to a DC voltage that is directly proportional to the frequency of the signal. The DC voltage is therefore directly proportional to wheel speed and is in the ratio of 0.04 volts per MPH.

MINOR CONTROL LOOP

The deep skid detector 32 of the minor control loop monitors the wheel speed signal from the frequency converter 22 for incipient wheel skids. It contains a speed memory circuit and threshold switching circuit. The deep skid detector 32 comes into operation when the first incipient skid results in an increment of wheel speed change in excess of approximately 15 miles per hour and sends a full release signal to the control valves 14 by way of the voltage amplifier 30 and current driver 42. This occurs mainly at low runway co-efficient or at light wheel loads. When the deep skid detector 32 operates it sends a signal to the initialization circuit in the modulator and adaptive deceleration reference circuit 34 in the major control loop so the pressure is reapplied at the correct level to achieve optimum control when the incipient skid is over. After the first incipient skid, the major control loop assumes control and the minor control loop is subordinated to a back-up roll. The minor control loop will not operate again during the stop unless the major control loop requires re-initialization such as may be required due to a large, abrupt drop in the runway friction co-efficient.

The voltage amplifier 30 receives the signals from all three control loops and sends an output signal to valve current driver 42. Since the valve 14 is a current operated device that is controlled by current rather than voltage signals, the changes in coil resistance, due to temperature changes, have no effect on the valve operating characteristics. Current limiting is inherent in the driver to protect it against a shorted output.

MAJOR CONTROL LOOP

The deceleration detector 24, forming a part of the major control loop, is a differentiating circuit. It monitors the wheel speed signal from the frequency converter 22 and produces an output signal that is a measure of the deceleration or acceleration rate of the wheel. A change in wheel speed, regardless of however small, produces an output of the deceleration detector 24 which is then fed to the modulator 26 and deceleration change detector circuit 46. The modulator contains initialization and integrator circuits.

The modulator 26 is the circuit that provides adaptability and high system operating efficiency by controlling the level at which brake pressure is reapplied after an incipient skid has been corrected, and by maintaining an average brake pressure level around which the major control loops can provide optimum braking control. During any incipient skid cycle the integrator is charged by the deceleration detector 24 or by the initialization circuit, depending upon the severity of the skid. This results in a DC output signal that is applied to the control valve by way of the summer 28. The level of this signal is determined by the duration of the incipient skid which is determined by the runway surface condition. On a dry runway, the incipient skid will be of a short duration while on a wet runway it will be of a longer duration. The initialization circuit responds to the width of the signal of the deep skid detector 32 and in turn charges the integrator to a high level (low brake pressure) for a low co-efficient runway or to a low level (high brake pressure) for a high co-efficient runway.

The adaptive deceleration reference (ADR) circuit 34 establishes the reference deceleration used by the modulator in determining what deceleration rate the anti-skid system should try to achieve. The ADR circuit determines the reference deceleration in a manner such that the amplitude of the wheel speed perturbations are kept to a predetermined level. The ADR circuit continuously monitors the output of the deceleration detector 24 for information concerning the amplitude of the incipient skid cycles. As the amplitude of the incipient skid cycles increases above the predetermined level, the ADR circuit 34 sends a signal to the modulator 26 which lowers the deceleration reference from its fixed 20 ft./sec.$^2$, causing the anti-skid system to try to achieve a lower deceleration rate and causes the amplitude of the incipient skid cycles to lower. Likewise, when the amplitude of the incipient skid cycles drops below the predetermined level, the ADR circuit 34 causes the anti-skid system to try to achieve a higher deceleration rate which causes more incipient skid cycle activity to occur. In this way, the ADR circuit forces the anti-skid system to achieve the proper deceleration rate that causes the wheel speed to cycle about the maximum allowable deceleration while keeping the incipient skid cycles at a predetermined level.

The ADR circuit also incorporates initialization. The deep skid detector 32 initializes the ADR circuit 34 to the approximately correct deceleration reference when a deep skid occurs. The longer the skid the lower the deceleration reference is initialized.

The initialization of the modulator 26 occurs on the first incipient skid cycle, after which the integrator decay rate brings the brake pressure into the optimum range where the major control loop takes over and controls the brake pressure throughout the remainder of the stop.

The deceleration change detector circuit 46 is a passive differentiator which provides information as to a change in wheel deceleration to effect a high degree of deceleration control. This circuit by controlling a change in deceleration prevents strut ocillations which appear as deceleration variations. It also serves to prevent skids from occurring by alerting the system to the smallest change in deceleration. The deceleration change signal and the slower responding modulator signal are applied to the summer circuit 28 where they are added together before being sent to the control valve 14.

The signal from the summer 28 is passed through a frequency compensation network 56 which increases the amplitude of the signal to compensate for a loss in a frequency response which occurs in the brake hydraulic system above 7 Hz. This network extends the overall frequency response of the system sufficiently to provide stable anti-skid control action in the range of 15 Hz. Operation in the range provides smooth braking without exciting the landing gear which has the natural frequency of from 5.5 Hz to 8 Hz.

AUXILIARY CONTROL LOOP

The auxiliary control loop functions to prevent the application of brake pressure prior to touchdown and during rebound condition, and also prevents a locked wheel under extremely slippery runway conditions.

A separate locked wheel arming circuit 38 is provided for each group of inboard and outboard wheels. This circuit receives speed input signals from the frequency converters 22 for all associated wheels along with a signal from a squat switch 40 for one landing gear. The locked wheel arming circuit 38 contains a speed memory circuit which is monitored by a threshold switching circuit. The threshold switching circuit actuates with any wheel speed input of 23 miles per hour and provides an output to the associated locked wheel detectors 50 at all speeds above this level. The memory circuit has a linear run-down time corresponding to 27 feet per second per second. For instance, if all speed input signals were simultaneously removed at 130 miles per hour, the switching circuit would maintain an arming output signal for 6 seconds. This memory feature provides protection against prolonged locked wheel conditions that may occur due to hydroplane conditions on the runway surface.

Prior to touchdown, the squat switch 40 sends a synthetic wheel speed signal of 130 miles per hour to the arming circuit 38 which results in an output signal to the locked wheel detector 50. At this time no wheel speed signal exists at the input of the locked wheel detector 50. The locked wheel detector thus senses the locked wheel condition and sends a full pressure release signal to the anti-skid control valve 14 thereby preventing any inadvertent brake pressure application prior to touchdown.

The locked wheel detector 50 has a switching threshold of 10 miles per hour. As the wheel spins up through 10 miles per hour at touchdown, the locked wheel detector 50 switches off the release signal to the anti-skid valve thereby allowing brake pressure application. As the landing gear compresses the squat switch 40 opens to remove the signal, however, the arming circuit 38 remains energized by the wheel speed input signals from the frequency converter 22. These signals provide an aircraft speed reference which keeps the arming circuit 38 energized down to 23 miles per hour where it then de-energizes. Any wheel whose speed drops below 10 miles per hour, while the aircraft speed is above 23 miles per hour will have its brake released. A 13 mile per hour switching threshold differential is maintained between the arming 38 and detector 50 circuits so that no false pressure release signals occur during taxi or parking operations.

The circuit further includes a pressure recovery control indicated generally by block 35, and a notch filter indicated by numeral 37, both of which will be defined in further detail hereinafter.

A more detailed description of certain of the component circuits of the anti-skid system of the present invention is given below.

FREQUENCY TO DC CONVERTER
CONVERTER OPERATION

Figure 2:
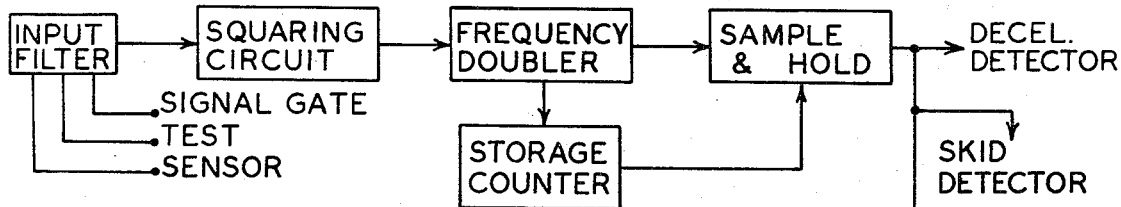
FIG. 2 is a block diagram of the frequency to DC converter circuit.

For purposes of discussion, as seen in FIG. 2, the converter circuit may be divided into the following six sub-circuits:
1. input filter
2. squaring circuit
3. frequency doubler
4. storage counter
5. sample and hold
6. LWA wheel speed The input filter is primarily utilized to attenuate the effects of spurious EMI signals riding on the sensor signal which could cause misleading information concerning the wheel speed. It also allows system test signals to be coupled into the converter.

The squaring circuit converts the sinusoidal wave form from the sensor to a square wave which is required for the rest of the converter circuitry.

The frequency doubler circuit doubles the frequency of the basic sensor signal in order to increase the low-speed resolution of the converter. The frequency doubler also provides a sample signal to the sample and hold circuitry.

The storage counter circuitry is the heart of the converter; it converts the frequency from the frequency doubler to a sawtooth wave form riding on a DC level that is proportional to the frequency.

The sample and hold circuit eliminates the sawtooth output from the storage counter by sampling the minimum value of the sawtooth wave form and holding this value between samples.

The locked wheel arming (LWA) wheel speed circuitry provides a separate wheel speed signal for the locked wheel arming circuitry. The output of the locked wheel arming wheel speed develops the maximum wheel speed for inboard or outboard wheels.

CONVERTER INPUT FILTER

Figure 3:
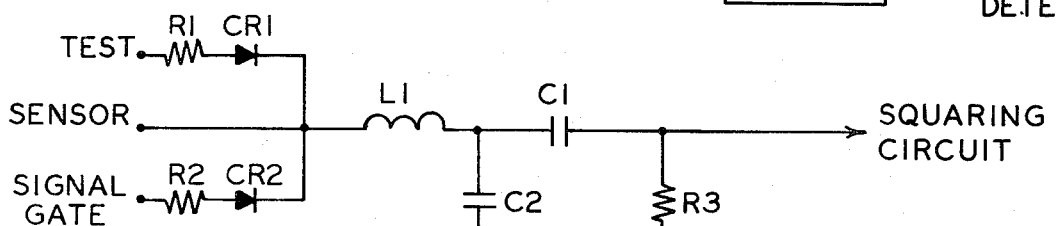
FIG. 3 is an electrical schematic of the input filter of the converter circuit.
Figure 4:
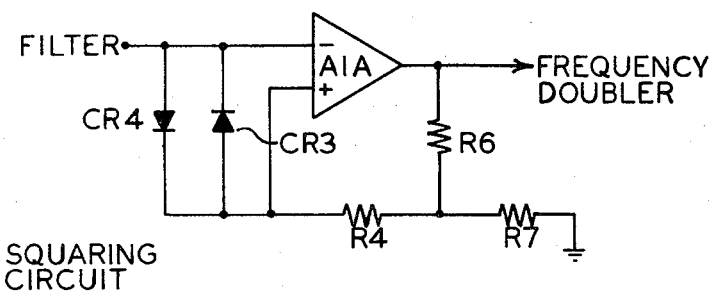
FIG. 4 is an electrical schematic of the squaring circuit of the converter.

Suppress on of spurious EMI signals is accomplished by a low pass filter as seen in FIG. 3 comprised of inductor L1 and capacitor C2. Resistor R1 and diode CR1 provide a bias current path to the sensor coil during system tests and during component testing of the sensor coil. Resistor R2 and diode CR2 provide an input path to the converter for the 200 Hz system test signal. Resistor R3 and capacitor C1 act as a DC blocking circuit to prevent saturation of amplifier A1A in the converter squaring circuit during system testing.

CONVERTER SQUARING CIRCUIT - FIG. 4

The output of amplifier A1A is the output of Schmitt trigger circuit. The hysteresis is set and a ± 50 millivolt bias on the noninverting input created by voltage dividers R6 and R7 and applied through R4. The output of A1A is a ± 10 volt square wave, the same frequency as the input signal.

When the level of the sine wave input received at the inverting input to A1A exceeds + 50 millivolts, the output of the amplifier flips to the −10 volt state. When the level of the sine drops below −50 millivolts, then the output flips to +10 volts. This 50 millivolt hysteresis prevents noise levels below 50 millivolts from firing the Schmitt trigger. R4 is used for matching the input impedances of amplifier A1A, and diodes CR3 and CR4 are used for input protection for amplifier A1A.

FREQUENCY DOUBLER

Figure 5:
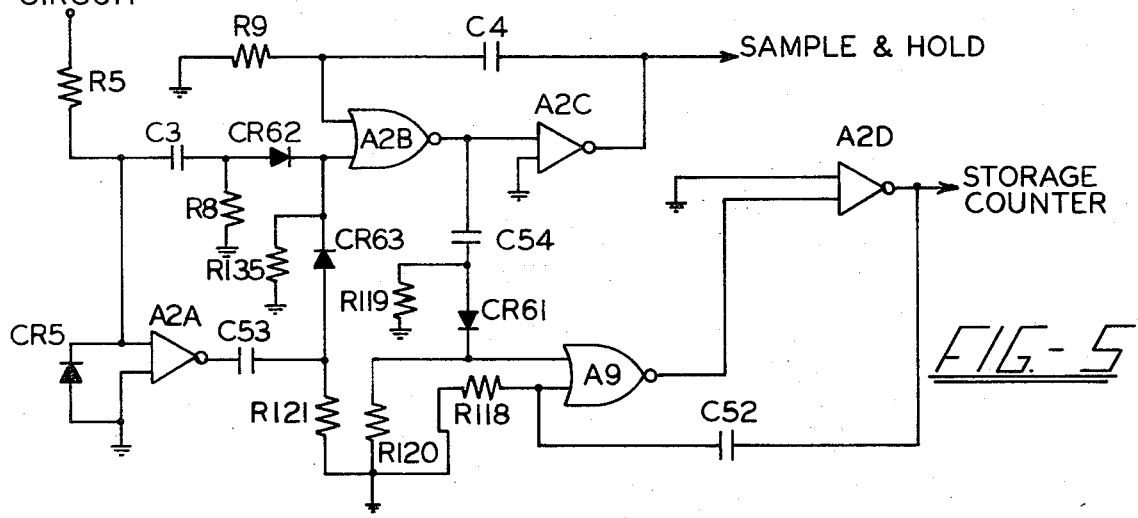
FIG. 5 is an electrical schematic of the frequency doubler portion of the converter circuit.

The frequency doubler circuit as shown in FIG. 5 produces a +10 volt sampling pulse of approximately 60 microseconds duration whenever the output of the converter squaring circuit changes state. The frequency doubler also produces a +10 volt 240 microsecond pulse to the storage counter approximately 60 microseconds after a change in state in the output of the converter squaring circuit. When a positive-going transition occurs at the output of the squaring circuit, a trigger pulse is produced at the anode of CR62 by resistors R5 and R8 and capacitor C3. This trigger pulse is then coupled to a one-shot, consisting of A2B, A2C, R9, and C4 by CR62 and R135. This causes the output of A2C to go to the +10 volts for approximately 60 microseconds and the output of A2B to go to zero for approximately 60 microseconds. The one-shot pulse duration time is determined by C4 and R9.

At the end of the 60 microseconds, the output of A2C snaps back to zero and the output of A2B goes back to +10 volts. This causes a trigger pulse to be formed at the anode of CR61. This trigger pulse is then coupled to another one-shot, consisting of A9, A2D, R118, and C52, by CR61 and R120. The resulting output at A2D is a +10 volt pulse lasting for approximately 240 microseconds. The one-shot duration time is determined by C52 and R118.

When a negative transition occurs at the output of the squaring circuit, the signal is clamped to zero at the input to A2A by R5 and CR5. The trigger pulse is then coupled to the first one-shot at A2B by CR63 and R135. The two one-shots then react in the same manner as just previously described.

STORAGE COUNTER

Figure 6:
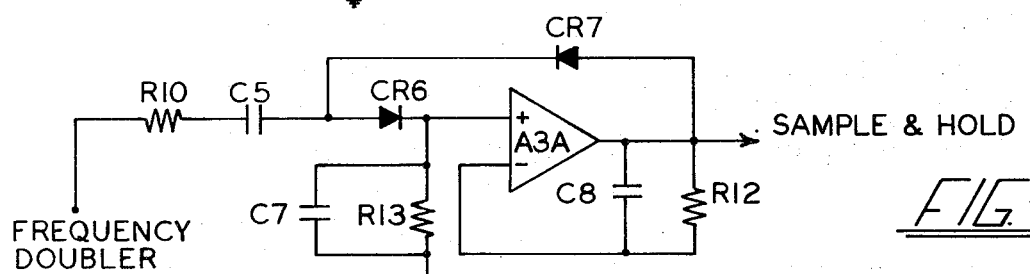
FIG. 6 is an electrical schematic of the storage counter portion of the converter.

During each positive transition of the square wave from the frequency doubler, the capacitor C7 as seen in FIG. 6 charges up approximately .45 volts (determined by C5) above its previous level via R10, C5, and CR6. Immediately after each charge, C7 begins to decay at a rate determined by R13. A3A is utilized as a voltage follower to prevent loading from changing the discharge rate of C7. Diode CR7 ensures that the change in charge of C7 will stay the same. The net result is a sawtooth wave form riding on a DC level. The DC level is directly proportional to the frequency input.

SAMPLE AND HOLD CIRCUIT

Figure 7:
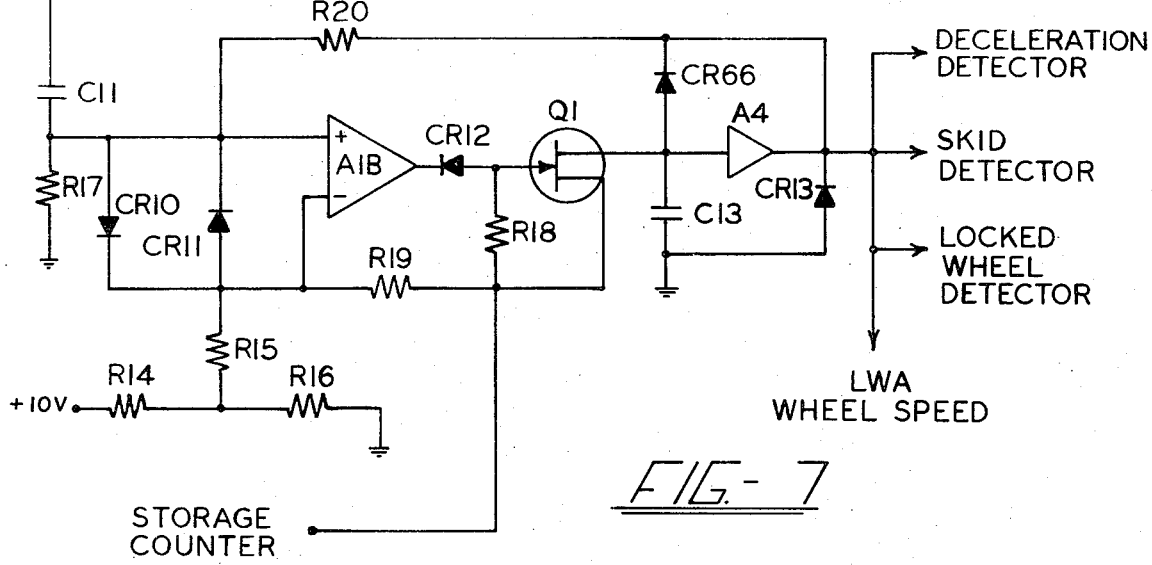
FIG. 7 is an electrical schematic of the sample and hold portion of the converter circuit.

The storage counter output is applied to the source of FET (Field effect transistor) sampling gate Q1 all as seen in FIG. 7. This source voltage contains undesired noise components which are uniquely eliminated by sampling to obtain the average voltage level used for the optimum representation of wheel speed.

Sampling is accomplished during the last 60 microseconds of the storage counter's discharge slope. The gate of Q1 is connected to its positive source by R18 which would keep Q1 switched on at all times except for the disable path provided by CR12 and the output of A1B normally held at 0 state.

Resistance seen by the noninverting input of A1B is R17 in parallel with R20 and is identical to the input resistance seen at the inverting inputs R15, R19, R14, and R16. Consequently, the 0.1 VDC, created by voltage divider R14 and R16 and applied to the inverting input by R15, maintains the 0 output state. CR10 and CR11 limit input signals to about .6 volts maximum.

When 60 usec positive pulses from the frequency doubler are differentiated by C11 and R17, 6 usec pulses are applied to the noninverting input of A1B driving it to saturation. The positive-going output of A1B blocks CR12 conduction and Q1's gate-to-source voltage is zero for about 10 microseconds. The source-to-drain resistance is very low, thus transferring whatever voltage level is present at the storage counter to storage capacitor C13 which provides a suppressed noise DC output signal closely proportional to wheel speed frequency.

A4 is a buffer amplifier operating at unity gain which transfers the noise free wheel speed voltage of .04 V/mph or .046 V/knot from C13 to various subsequent inputs; i.e., deceleration detector, locked wheel detector, and deep skid detector.

In the event that wheel speed drops to 0, no further update of wheel speed is possible because there are no sample pulses.

To overcome this updating problem at 0 wheel speed, the outputs from A4 and the storage counter are fed back to the A1B input through R20 and R19, respectively.

When the signal from the storage counter drops below the output of A4 by 100 millivolts, A1B is switched to its high (+10 volts) state allowing Q1 to be turned on and C13 to be constantly updated under these conditions. This allows the output of the converter to function properly even when the wheel enters a deep skid with no sampling pulses being produced.

DEEP SKID DETECTOR

As seen in FIG. 8 during the time of increasing wheel speed the DC output from the frequency to DC converter is applied across reference capacitor C20 through R42 and diode CR20. As deep incipient skids occur, wheel speed and resultant converter voltage is lowered which forces C20 to seek a discharge path through R44 and R43. This additional current through R44 lowers the voltage at the inverting input of A7A. A7A acts as a voltage comparator which is normally biased such that the inverting input is more positive than the noninverting input to keep the output in a low 0 state. If the skid is severe enough, the inverting input of A7A will move sufficiently negative to match or exceed the threshold setting, causing the output to go to a high 1 state. This will occur with a rapid deviation in wheel speed of 15 mph. Temperature compensation is provided at CR21.

When the output of A7A is in its low 0 state, CR22 is conducting and FET, Q3 gate is held negative to keep the source-to-drain open preventing an output from the deep skid detector. As A7A goes to its high 1 state, R47 causes Q3 to saturate which effectively shorts the source and drain together.

Consequently, during a deep skid Q3 switches its 10-volt source potential to the drain where it is scaled to about 4.5 volts by R48 and R49 and fed to the voltage amplifier and valve driver circuits to provide the required brake pressure dump signal. Also, the drain signal of +10 volts is utilized to initialize the modulator, the adaptive deceleration reference circuit, and actuate the brake release lights. Q2B resets the skid detector after test by providing a discharge path for C20 during reset time. Q2B is turned on by applying a positive signal to its base by way of R41 and CR18.

DECELERATION DETECTOR

The deceleration detector as shown in FIG. 9 is an inverting differentiator whose volt per volt per second gain is determined by resistor R33 and capacitor C17. The deceleration detector output is a voltage proportional to the wheel deceleration. Resistor R32 rolls off the differentiator frequency response.

DESCRIPTION OF MODULATOR

For purposes of discussion, as shown in the block diagram of FIG. 10, the modulator can be broken down into three subcircuits—a summing point, an integrator, and an initialization circuit. The modulator summing point has a built-in deceleration reference corresponding to 20 ft./sec$^2$. This reference is reduced to the proper deceleration rate by signals from the adaptive deceleration reference circuit. The deceleration rate from the deceleration detector is then compared with the deceleration reference determined by the adaptive deceleration reference circuit. The resulting deceleration error signal is then sent to the modulator integrator where it is integrated to establish the correct pressure level at which the antiskid should operate. The duration of a deep skid when pressure is first applied contains information concerning the runway ground coefficient. This information is sent to the modulator by the deep skid detector. The initialization circuit then quickly sets the modulator to the proper operating level.

MODULATOR SUMMING POINT

As shown in FIG. 11 the actual deceleration error signal is developed at the junction of resistors R59, R133, and R60. The fixed deceleration reference of 20 ft./sec$^2$ is set by dividing down the −10 volts with the divider consisting of resistors R61 and R62. The fixed reference signal is then sent to the summing point via resistor R60. The ADR signal is positive and enters the summing point via resistor R133; and since the fixed deceleration reference is negative, the net effect of the ADR signal is to lower the reference signal below 20 ft./sec$^2$. The deceleration signal is then summed to the adjusted deceleration reference through resistor R59, thus developing the proper error signal.

MODULATOR INTEGRATOR

As also shown in FIG. 11, the error signal from the modulator summing point is then integrated by the integrator consisting of R152, C22 and A5 with FET Q4 normally turned on (that is Q4 source-to-drain conducting). The integrator gain in volts per volt second is determined by resistor R152 and C22. FET Q4, R63, and CR26 are used as an electronic switch to shut down the modulator by shutting down its integrator during a system test. This prevents the modulator from holding off brake pressure at the completion of the test.

MODULATOR INITIALIZATION

If a deep skid occurs, an increment of wheel speed changes in excess of 15 mph, a +10 VDC signal emanates from the deep skid detector and initializes the modulator.

With reference to FIG. 12, the +10 VDC pulse lasts as long as the deep skid period and is fed to the initialization circuit through CR30 where it charges C24 at an exponential rate through R67. The instantaneous charge of C24 is fed through R70 to the noninverting input of A6, where it is summed with the negative-going integrator output. The resultant difference voltage is amplified by A6 and applied to source of integration Q4 to increase the level of integrator charge beyond that established by the deceleration detector.

The initialization capacitor or C24 begins to discharge the instant a deep skid signal ceases due to the forward conduction of CR29 shunting R67. CR28 then becomes reversed biased and the integrator is left at some "initialized" level.

ADAPTIVE DECELERATION REFERENCE (ADR)

The adaptive deceleration reference (ADR) is composed of three subcircuits as shown in block diagram of FIG. 13—a filter, a reference change, and a pressure recovery control circuit. The ADR filter receives deceleration signals from the deceleration detector and filters out everything except deceleration perturbations necessary in controlling the wheel. These signals are then sent to the ADR reference change circuit and the pressure recovery control circuit. The ADR reference change circuit rectifies and filters these decelerations to send a signal to reduce the deceleration reference in accordance with the level of the perturbations. The net effect is that a deceleration rate is adjusted to the maximum possible level. The pressure recovery control circuit also receives signals from the ADR filter. As long as there is wheel activity, a signal will be sent to the pressure recovery control circuit to keep it turned off. If, for some reason, the modulator is suddenly at a higher level than it should be (such as a rapid increase in runway ground coefficient), then the wheel will no longer be working hard enough to cause deceleration perturbations and the pressure recovery control will switch on. When the pressure recovery control switches on, it sends a signal to the modulator to have it start rapidly applying pressure.

ADR FILTER

The deceleration detector signals enter the ADR filter shown in FIG. 14 through R166. The input circuitry associated with R166 provides DC blocking and negative clipping since we are interested only in the positive deceleration perturbations and not the actual deceleration. C59, R146, R151, and A18 serve as a low pass filter with gain. The gain of the filter is determined by the ratio of R146 to R151. The high frequency cutoff is determined by the parallel combination of R146 and R151 and C59. The filter section consisting of R148, R149, C48, A7, C50, and R130 is basically a quadratic lag to provide a sharper cutoff of higher frequencies. R148, R149, C48, and C50 determine the cutoff frequency. The ratio of C48 to C50 determines the damping ratio of the quadratic lag.

ADR REFERENCE CHANGE

The ADR reference change as seen in FIG. 15, peak detects the wheel deceleration perturbation signals from the ADR filter. Positive perturbations charge up C51 via R132 at a rate determined by R132, C51, and R134. The capacitor C51 bleeds off at a rate determined by the modulator loading and C51. The charge on C51 determines the amount of deceleration reference change. The ADR reference change also is initialized by a deep skid. The deep skid detector sends an initialization signal that charges C51 via CR65 and R131.

PRESSURE RECOVERY CONTROL

Figure 16:
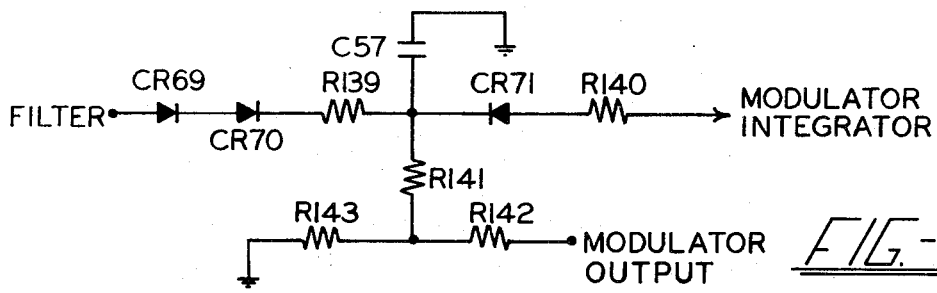
FIG. 16 is an electrical schematic of the pressure recovery control circuit.

As shown in FIG. 16, wheel perturbations keep a positive charge on C57 through the peak detector consisting of CR69, CR70, R139, and C57. As long as C57 is charged positively, then CR71 is back biased and no output is sent to the modulator. When the wheel perturbations stop, C57 discharges through R141 and R143. Since the modulator output is a negative signal divided down by R142 and R141, then CR71 is allowed to conduct. With CR71 conducting, a signal is sent to the modulator via R140 causing it to start rapidly applying brake pressure.

DECELERATION CHANGE DETECTOR

The deceleration change detector is shown in FIG. 17. It serves to detect changes in decelerations which are used to prevent skids. By this same action strut oscillations are controlled. Deceleration variations are passed through C18, R144, and R35 and R36 and the summer. The gain of the deceleration change signal is determined by R35, R144, and R36. Phasing of the deceleration change signal is controlled by R145. CR72 is utilized to clamp acceleration signals which can cause pressure to be applied too rapidly thus forcing the system into a skid.

SUMMER

Figure 18:
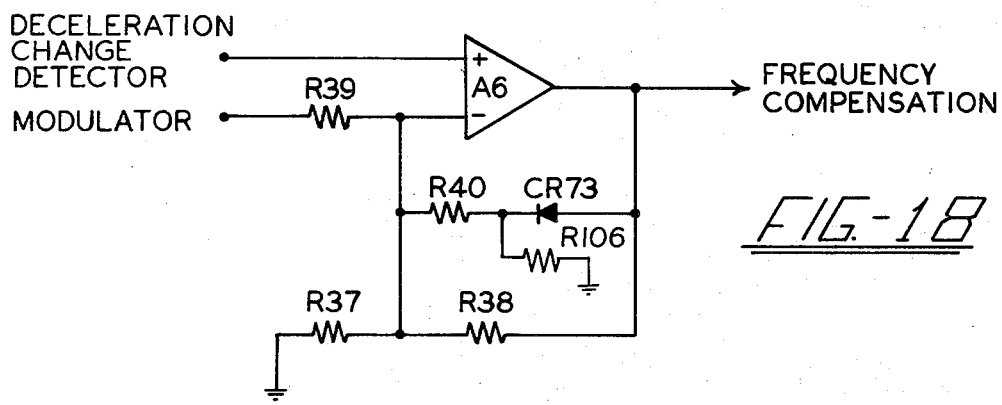
FIG. 18 is an electrical schematic of the summer circuit.

The summer, as seen in FIG. 18, adds the modulator signal and the deceleration change detector signal together with a different gain factor associated with each signal. The gain of the deceleration change detector signal is determined by all three resistors R37, R38, and R39, whereas the gain of the modulator is solely determined by the ratio of R38 to R39.

As is true most hydraulic valves, the valve has a dead band which in the particular application set forth by applicants, is anywhere from 4 to 6 milliamps average current. During that time, if the pressure is full on, and you are within the dead band, and the system asks for a release of pressure and increases to anywhere within the limit, the dead band does not see it, so that the system must increase the pressure beyond that range in order to get a reaction. To counteract this problem, the summer as seen in FIG. 18 includes a second feedback line around amplifier A6 which includes resistor R40 and diode CR73. The diode CR73 in effect sets the system so that if the output is below a predetermined minimum voltage, the system automatically considers that it is in the dead band range, and the gain from the summer will be seven times higher than normal. As soon as the system gets back into the normal range, the gain from the summer drops back down again to normal output.

FREQUENCY COMPENSATION

Figure 19:
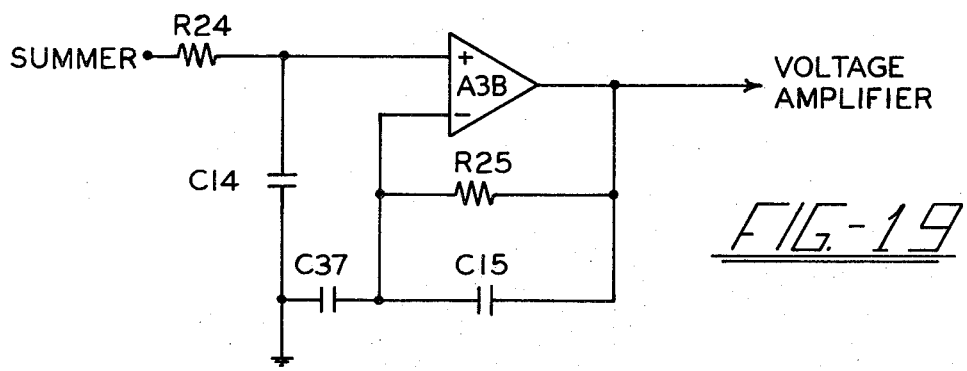
FIG. 19 is an electrical schematic of the frequency compensation circuit.

The frequency compensation circuit as shown in FIG. 19, provides compensation for poor frequency response. Compensation is provided with the use of a lead and two lags. The lead is determined by R25 and the sum of C15 and C37. The first lag is determined by R25 and C37, and the second lag is determined by R24 and C14.

The deceleration change detector circuit of FIG. 17 also includes a resistor capacitor network C65, R167. This network provides that there will not be a build-up of a DC level which would normally release brake pressure. Hence, the circuitry only lets AC signals caused by changes of deceleration to get through to the valve 14 while eliminating or acting as a decoupling capacitor to prevent the passage of DC to the valve.

Figure 20:
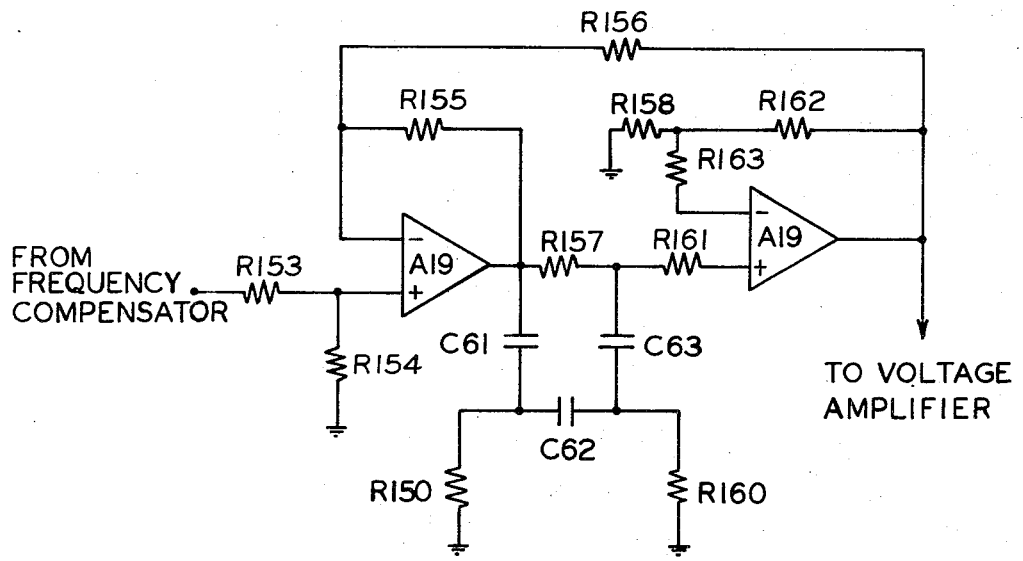
FIG. 20 is an electrical schematic of the notch filter circuit.

The notch filter illustrated schematically in FIG. 20 is a unique device to provide a very narrow notch of approximately only about 8 cycles wide on each side of the notch. It is designed to filter out the natural vibration frequency of the bogie beam of large aircraft. What occurs is that as the wheel decelerates with hard braking control, vibrations of the landing gear occur. The bogie beam will tend to oscillate at its natural frequency, in a range of 16 to 31 cycles. These frequencies can be reenforced by the antiskid system if not subdued by the filter. The filter of FIG. 20 attenuates the signals to the valve in this range and is designed specifically at the range around a 23 cycle midpoint. This natural vibration tends to occur at about 30 miles per hour in the airplane, although it can occur at any speed. The notch filter in effect acts as a very precise area of elimination in the frequency band, and at frequencies on either side of it, there is no attenuation, and the system operation is perfectly normal.

In essence, the components of FIG. 20 are substantially conventional, but the input signal comes in to the first amplifier A19 and then is applied to a standard "T" filter comprising capacitor C61 through C63, and their corresponding resistors R150, R160, and R157. The output of the "T" filter consists of a notch which is fairly wide and does not have a very good phase relationship. That information is sent into the second amplifier A19 which then amplifies all the frequencies that do come through. The output of the second A19 amplifier is fed back to the first, which results in reinforcing those frequencies that do get through, but no reinforcement of the notch. This feedback relationship creates a very deep notch which is also narrow and which has better phase relationship.

CIRCUIT THEORY

Hereinafter will follow a discussion of the theory behind the circuitry and the mathematics thereof involved with the deceleration detector 24, deceleration change detector 46, and the modulator 26. Specifically, the signal generated by the deceleration detector 24 is the first derivative of wheel speed. This provides the deceleration that the aircraft is undergoing. The value is then compared with a fixed value obtained from the −10 volt reference through R62 in the summing portion of the modulator as seen in FIG. 11, to obtain a difference signal which is then stored in the modulator. The reference signal is generally about 20 feet per second squared with the comparison taking place in integrator A5 to provide a fixed current into the hydraulic fluid control valve 14 to control deceleration.

The second derivative of deceleration is generated in the deceleration change detector circuit of FIG. 17, and it will generate a signal only if deceleration is changing as the second derivative of a constant deceleration is zero. Therefore, anything that changes the wheel speed from a certain or substantially constant deceleration will produce a signal through the deceleration change detector circuit and results in direct and rapid responsive pressure changes to the valve 14.

Hence, it is seen that the system provides a highly adaptive and sophisticated skid control system which utilizes the following unique characteristics:
1. A variable deceleration threshold
2. A converter with sample and hold features, and fast response.
3. A fast pressure recovery when no skid control activity is present.
4. A notch filter to suppress undesirable landing gear vibration frequencies from interferring with the normal anti-skid control.
5. A frequency compensation to extend the control range of the anti-skid system to higher frequency operation that may otherwise be limited by the hydraulic system frequency response.
6. A feedback control in the summer circuit (CR73, R106, R140) that causes a high gain signal in low current (dead band) range of electrically controlled hydraulic valve operation to bring the valve operation out of the dead band range and into the control range rapidly.
7. A deceleration change detector circuit that provides a means for detecting change in deceleration and providing an early correction signal to the valve, before normal modulation takes place.

While in accordance with the patent statutes, only the best known embodiment of the invention has been described in detail, the invention is not so limited. Reference should therefore be had to the appended claims in determining the true scope of the invention.

What is claimed is:

1. An anti-skid control system for a vehicle having a rotatable wheel, hydraulic brake means associated with the wheel, current controlled valve means regulating hydraulic pressure to the brake means, and sensor means connected to the wheel and producing a DC signal proportional to wheel rotational velocity, comprising:

a modulator connected to the valve means and controlling the application of brake pressure, the modulator having an initialization circuit associated therewith;

a minor control loop connected to the sensor means, valve means and initialization circuit and operative on a first incipient skid to totally release brake pressure and initialize the modulator to reapply brake pressure to a level determined by the severity of the first incipient skid;

a major control loop interconnected between the sensor means, minor control loop and modulator and applying to the modulator a variable deceleration reference signal indicative of a desired rate of deceleration of the wheel and a deceleration signal indicative of the actual rate of deceleration of the wheel, the modulator controlling the application of brake pressure according to the correlation between the two signals, the variable deceleration signal being a function of the signal indicative of the actual rate of deceleration and being initialized by the minor control loop to a level commensurate with the degree of severity of the first incipient skid; and a deceleration change detector connected to the major control loop and applying to the valve means signals indicative of the rate of change of wheel deceleration with respect to time.

2. The anti-skid control system as recited in claim 1 which further includes a notch filter interposed between the modulator and valve means and operative to negate the effect of signals induced into the anti-skid control system by vibrating activity of the vehicle.

3. The anti-skid control system as recited in claim 2 which further includes a pressure recovery control circuity interconnected between the major control loop and the modulator and operative to cause the modulator to immediately apply brake pressure if the actual rate of deceleration of the wheel is not sufficient to cause perturbations.

4. The anti-skid control system as recited in claim 1 wherein the minor control loop comprises a deep skid detector producing a fixed level output signal when a rapid change in speed occurs.

5. The anti-skid control system as recited in claim 4 wherein the major control loop comprises a differentiator circuit producing the actual deceleration signal, an adaptive deceleration reference circuit receiving the actual deceleration signal and creating a variable deceleration reference signal based on perturbations of the actual deceleration signal.

6. The anti-skid control system as recited in claim 5 wherein the adaptive deceleration reference circuit comprises a filter receiving the actual deceleration signal and filtering out all but the perturbation signal and a capacitor charged by the perturbation, the charge on the capacitor controlling the change in the variable deceleration reference signal.

7. The anti-skid control system as recited in claim 1 wherein the modulator includes: a summing point biased by a voltage corresponding to a fixed deceleration rate, the variable deceleration reference signal being applied to the summing point and thus creating an error signal; and an integrator connected to the summing point and receiving the error signal.

8. The anti-skid control system as recited in claim 1 which further includes an auxillary control loop comprising a locked wheel detector connected to the sensor means and producing an output signal releasing brake pressure if the wheel speed drops below a first level and a locked wheel arming circuit connected to the locked wheel detector and sensor means and inhibiting the output signal if the vehicle speed is below a second level.

9. An anti-skid system for a vehicle having at least one rotatable wheel controllable by associated hydraulic brake means, the brake means in turn controlled by valve means, and which further includes sensor means connected to each wheel and producing a DC signal proportional to wheel velocity, comprising:

a modulator connected to the valve means and having a summing point biased by a voltage indicative of a fixed reference rate of deceleration, an integrator connected to and integrating signals from the summing point;

a deep skid detector connected to the sensor means, modulator and valve means and, upon a predetermined rapid change in wheel speed, causing the valve means to fully release brake pressure and initializing the modulator to reapply brake pressure at a level dependent on the degree of change of wheel speed experienced;

a deceleration detector circuit connected to the sensor means and applying to the summing point a signal indicative of actual wheel deceleration, the modulator controlling the application of brake pressure according to the variance between the biased level and said signal applied to the summing point;

an adaptive deceleration reference circuit connected to the deep skid detector and deceleration detector and applying a reference change signal to the summing point in accordance with the degree of wheel speed change evidenced by the deep skid detector and perturbations in the signal indicative of actual wheel deceleration and a notch filter interconnected between the valve means in the modulator and tuned to negate signals at the same frequency as the characteristic vibratory frequency of the vehicle's mechanical structure.

10. The anti-skid system as recited in claim 9 which further includes a deceleration change detector connected to the deceleration detector and applying to the valve means a signal indicative of the instantaneous rate of change of wheel deceleration to affectuate rapid changes in brake pressure.

11. The anti-skid system as recited in claim 10 which further includes pressure recovery control means connected to the modulator and causing the immediate application of brake pressure if there are no perturbations in the signal from the deceleration detector.

12. The anti-skid system as recited in claim 9 wherein the adaptive deceleration reference circuit includes a filter receiving the signal from the deceleration detector circuit and applying the perturbations thereof to a charging circuit, the charging and discharging of which controls the application of the reference charge signal to the summing point.

13. The anti-skid system as recited in claim 9 which further includes a locked wheel detector and arming circuit connected to the sensor means for applying a signal to the valve means achieving a release of brake pressure if the velocity of one wheel drops below a first level while the velocity of any other wheel is above a second level.

* * * * *